United States Patent
Hayashi

(12)
(10) Patent No.: US 6,268,004 B1
(45) Date of Patent: Jul. 31, 2001

(54) METHOD FOR CONTINUOUSLY AND QUANTITATIVELY SUPPLYING BREAD DOUGH

(75) Inventor: Torahiko Hayashi, Tochigi-ken (JP)

(73) Assignee: Rheon Automatic Machinery Co., Ltd. (JP)

( * ) Notice: Subject to any disclaimer, the term of this patent is extended or adjusted under 35 U.S.C. 154(b) by 0 days.

(21) Appl. No.: 09/656,664

(22) Filed: Sep. 7, 2000

Related U.S. Application Data

(62) Division of application No. 08/862,156, filed on May 22, 1997, now Pat. No. 6,126,431.

(30) Foreign Application Priority Data

May 22, 1996 (JP) .................................................... 8-149792

(51) Int. Cl.[7] .................................................... A21D 6/00
(52) U.S. Cl. .................................... 426/496; 426/502; 426/517
(58) Field of Search .................................... 426/496, 502, 426/504, 512, 516, 517; 425/141, 145, 239, 367, 371

(56) References Cited

U.S. PATENT DOCUMENTS

| | | |
|---|---|---|
| 3,553,775 | 1/1971 | Decker . |
| 4,276,317 | 6/1981 | Hayachi . |
| 4,338,341 | 7/1982 | Glass . |
| 4,375,349 | 3/1983 | Urbanek . |
| 4,869,661 | 9/1989 | Nogueroles . |
| 4,904,491 | 2/1990 | Morikawa et al. . |
| 4,946,699 | 8/1990 | Kageyama et al. . |
| 5,091,202 | 2/1992 | Hayashi . |
| 5,110,277 | 5/1992 | Hayashi . |
| 5,124,163 | 6/1992 | Hayashi . |
| 5,204,123 | 4/1993 | Hayashi . |
| 5,225,209 | 7/1993 | Hayashi . |

(List continued on next page.)

FOREIGN PATENT DOCUMENTS

| | | |
|---|---|---|
| 687310 | 5/1996 | (AU) . |
| 44 24 461 | 7/1994 | (DE) . |
| 44 24 461 A1 | 7/1994 | (DE) . |
| 0 140 458 | 5/1985 | (EP) . |
| 0 251 138 | 1/1988 | (EP) . |
| 0 326 404 | 1/1989 | (EP) . |
| 0 311 240 | 4/1989 | (EP) . |
| 0 453 248 | 10/1991 | (EP) . |
| 0 545 725 | 6/1993 | (EP) . |

(List continued on next page.)

OTHER PUBLICATIONS

Abstract of RU 20 201 723.

\* cited by examiner

Primary Examiner—George C. Yeung
(74) Attorney, Agent, or Firm—Brinks Hofer Gilson & Lione

(57) ABSTRACT

A method and apparatus are provided for continuously and quantitatively supplying bread dough. The apparatus comprises a pressing structure that includes two movable members, one of which includes at least one roller or one belt conveyor, and the other of which includes at least one belt conveyor, the roller being adapted to rotate about its own axis to apply a force to pull bread dough downward and the belt conveyor being adapted such that a portion of its conveying surface contacting the dough moves downward to pull the bread dough downward. The two movable members are oppositely positioned in a generally horizontal direction, one or both of the two movable members being adapted to reciprocally move in a generally horizontal direction to increase and decrease the distance between the two movable members, thereby preventing the pressure applied to the bread dough positioned between the two movable members from being excessively increased, so as to allow the bread dough to flow stably downward from therebetween.

1 Claim, 4 Drawing Sheets

| U.S. PATENT DOCUMENTS | | | | FOREIGN PATENT DOCUMENTS | | |
|---|---|---|---|---|---|---|
| 5,232,713 | 8/1993 | Morikawa et al. . | | 0 657 101 | 12/1994 | (EP) . |
| 5,266,341 | 11/1993 | Morikawa et al. . | | 0 744 126 | 5/1996 | (EP) . |
| 5,498,148 | 3/1996 | Ouellette et al. . | | 60-184345 | 9/1985 | (JP) . |
| 5,505,970 | 4/1996 | Morikawa . | | 61-6782 | 2/1986 | (JP) . |
| 5,733,589 | 3/1998 | Oki . | | 5-3253 | 1/1993 | (JP) . |
| 5,888,573 | 3/2000 | Hayashi . | | 6-37 | 1/1994 | (JP) . |
| 6,117,472 * | 9/2000 | Yonemaru et al. | 426/502 | 20 201 723 | 5/1991 | (RU) . |

METHOD FOR CONTINUOUSLY AND QUANTITATIVELY SUPPLYING BREAD DOUGH

This application is a division of application Ser. No. 08/862,156, filed May 22, 1997, now U.S. Pat. No. 6,126,431.

BACKGROUND OF INVENTION

1. Field of Invention

The present invention relates to a method and apparatus for bread production, and more particularly a process and apparatus for stably forming a continuous and uniform belt-like strip having a predetermined thickness from a gel-like elastic material such as bread dough by causing the dough to effectively and constantly flow downward from an outlet provided at the bottom of a hopper.

2. Description of the Related Art

In a conventional method to produce a large amount of bread, a certain amount of bread dough in a hopper is sucked by a piston into a cylinder provided at the bottom of the hopper, and then the bread dough is extruded from the cylinder and cut, and this cutting and extruding step is repeated.

The above-mentioned conventional method contains many complicated steps. Also, this method applies repeated shearing stress to the bread dough which decreases its elasticity. Therefore, a chemical additive such as potassium bromate is added to the bread dough to restore the original gluten tissue and to recover its membrane function, which is required for producing bread.

Japanese Patent Publication Nos. 5-3253 and 6-37 disclose additional apparatuses and methods. These references teach pressing dough between rotating opposed rollers to continuously produce a dough strip. However, these references teach a method by which the pressure on bread dough applied by the opposed rollers is prevented from increasing too much by detecting with a sensor a relevant amount of dough supplied from an upper pair of pressing rollers to a lower pair of pressing rollers, and then adjusting the rotating speed of the upper pressing rollers based on this sensed amount. However, the methods and apparatuses disclosed by these references are also complicated and expensive. Further, a distance between the rollers of each pair of rollers is fixed, thereby limiting the properties and amount of dough passing between the rollers, and subjecting the dough to excessive pressure such that the elasticity of the dough is lost.

SUMMARY OF THE INVENTION

The present invention overcomes the disadvantage in the conventional methods by enhancing the discharging effectiveness of dough from the gap between opposed pairs of pressing structures, while retaining effective pressing movements by the opposed pairs of pressing structures.

An object of the present invention is to provide a method of continuously and quantitatively supplying bread dough, which comprises providing a pressing structure including two movable members, one having at least one roller or one belt conveyor and the other having at least one belt conveyor, such that the two movable members are oppositely positioned in a generally horizontal direction below a bread dough feeder, putting bread dough into the bread dough feeder, and actuating the two movable members to reciprocally move in a generally horizontal direction to increase and decrease the distance between the two movable members, thereby preventing the pressure applied to the bread dough positioned between the first and second movable members from being excessively increased, so as to allow the bread dough to stably flow downward therebetween.

Another object of the present invention is to provide an apparatus for continuously and quantitatively supplying bread dough comprising a pressing structure provided below a bread dough feeder which includes two movable members, one of which includes at least one roller or one belt conveyor, and the other of which includes at least one belt conveyor, the roller being adapted to rotate about its own axis to apply a force to pull bread dough downward from the bread dough feeder. The belt conveyor is adapted such that its conveying surface moves in a downward direction to apply a force to pull the bread dough downward. The two movable members are oppositely positioned in a generally horizontal direction, both or either of the two movable members being adapted to reciprocally move in a generally horizontal direction to increase and decrease the distance between the two movable members, thereby preventing the pressure applied to the bread dough positioned between the first and second movable members from being excessively increased, so as to allow the bread dough to stably flow downward there between.

DESCRIPTION OF THE PREFERRED EMBODIMENTS

U.S. patent application Ser. No. 08/651,107, filed on May 21, 1996, now U.S. Pat. No. 6,155,814, which was filed by the present applicant, is directed to a method and apparatus for continuously and uniformly supplying dough. According to the disclosed method and apparatus, at least one horizontally-positioned pair of members that are rotatable in opposite directions, and the distance between the pair of members is repeatedly increased and decreased to prevent excessive stress in the dough located between the pair of members, so that the dough can be constantly discharged from the gap between the pair of members.

Figure 1:
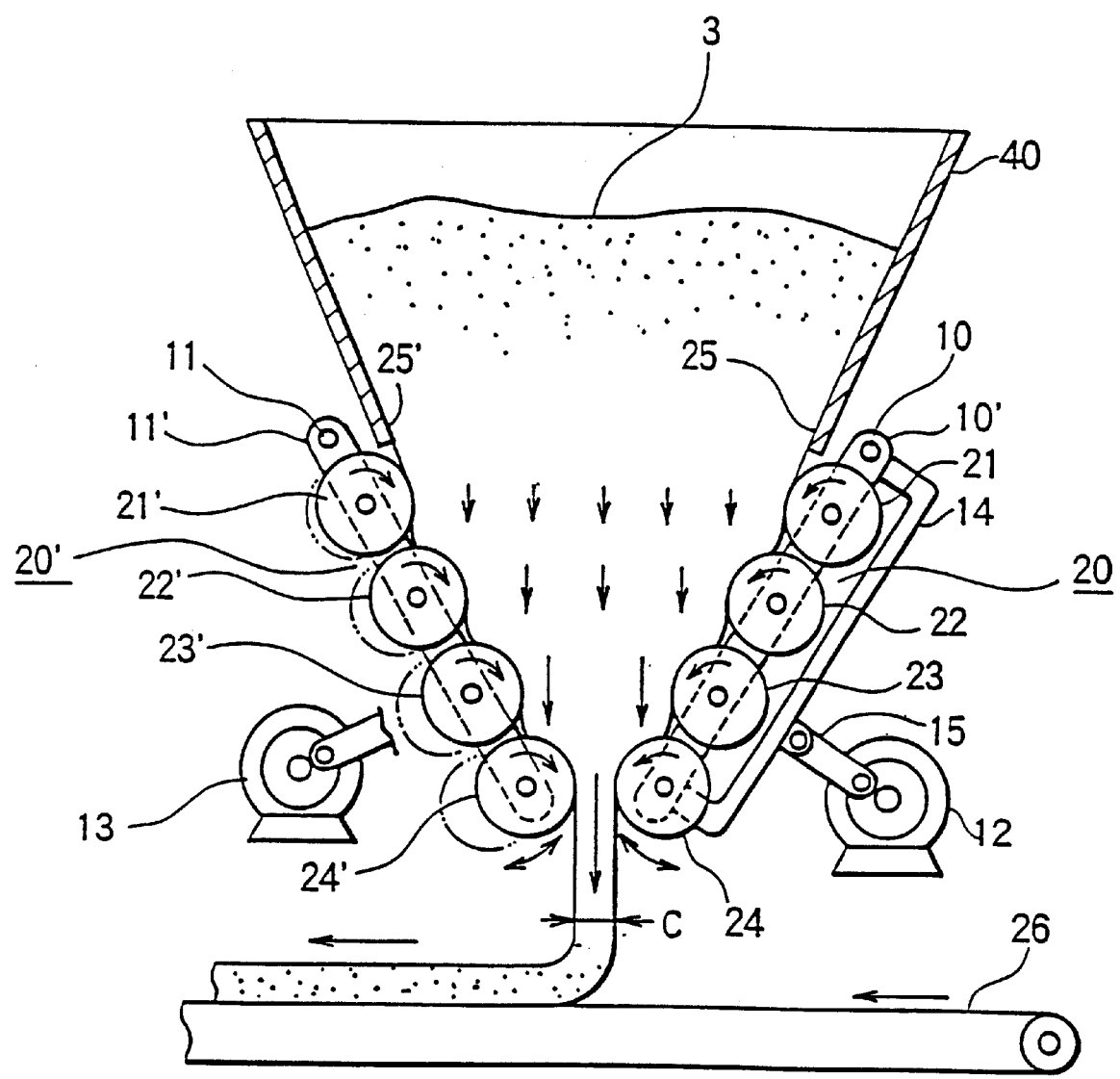
FIG. 1 is a sectional view illustrating an apparatus disclosed in a related application.

FIG. 1 illustrates an embodiment disclosed in the above-mentioned application. The apparatus comprises opposed roller groups 20 and 20' including rollers 21, 22, 23, and 24, and rollers 21', 22', 23', and 24', respectively. The groups 20 and 20' are oppositely positioned, namely the rollers 21, 22, 23, and 24 are opposite the rollers 21' 22', 23', and 24', respectively, to compose four pairs of rollers. The rollers of the group 20 are rotated in an opposite directions to those of group 20' to pull the dough 3 downward, while the swingable rod 10' on which the rollers 21, 22, 23, and 24 are mounted is swung about the supporting point 10, and the arm 11' on which the rollers 21', 22', 23', and 24' are mounted is swung about the supporting point 11, by energizing the motors 12 and 13. Therefore, these pairs of rollers are repeatedly and reciprocally moved such that the distances between the pairs of rollers are repeatedly increased and decreased, thereby preventing excessive pressure on the dough 3 located between the roller groups 20 and 20', and the dough 3 flows downward from the gap c.

However, the contact areas of the rotating rolls 21, 22, 23, and 24, and rolls 21', 22', 23', and 24', of the groups 20 and 20' with the surface of the dough 3 are relatively small. Further, the frictional force of a roll on the bread dough is relatively low, as compared with that of the belt of a belt conveyor. Therefore, the effectiveness in pulling the dough downward by the frictional engagement of the rolls with the surface of dough is low, leading to a low effectiveness in producing a large amount of bread dough.

A first embodiment of the present invention will now be described with reference to FIG. 2.

In accordance with the first embodiment, a pressing structure is positioned just below the bottom opening of a bread dough feeder, namely, a hopper 40. The pressing structure comprises first and second movable members.

The first movable member includes first and second belt conveyors 55 and 56. The first belt conveyor 55 includes rollers 21 and 22, and an endless belt entrained over the rollers 21 and 22. The shafts of the rollers 21 and 22 are received in bearings (not shown) mounted on a swingable rod 10'. The rollers 21 and 22 are adapted to rotate by respective drive means (not shown) at the same peripheral speed in directions indicated by arrows in FIG. 2, so that the conveying surface of the endless belt entrained over the rollers 21 and 22 pulls the bread dough 3 downward (away from the hopper 40). The second belt conveyor 56 is positioned below the belt conveyor 55 in a serial arrangement. The belt conveyor 56 includes rollers 23 and 24, and an endless belt entrained over the rollers 23 and 24. The shafts of the rollers 23 and 24 are received in bearings (not shown) mounted on the swingable rod 10'. The rollers 23 and 24 are also adapted to rotate by respective drive means (not shown) in directions indicated by arrows shown in FIG. 2 at a peripheral speed higher than that of the rollers 21 and 22. Therefore, the conveying surface of the belt entrained over the rollers 23 and 24 pulls the bread dough 3 downward at a higher conveying speed than that of the conveying surface of the belt conveyor 55. The first movable member 10 also includes an arm 14 attached to the swingable rod 10'. The arm 14 is pivotably connected to a crank arm 15 by a pin. One end of the crank arm 15 is pivotably connected to a rotary disk of a motor 12 by a pin.

With the above-described arrangement, when the motor 12 is driven, the crank arm 15 swings about its pin connection to the rotary disk, and simultaneously swings about the pin connection to the arm 14, so that the arm 14 swings about a supporting point 10. Therefore, the arm 14 and the conveying surfaces of the belt conveyors 55 and 56 are reciprocally moved in a generally horizontal direction while the conveying surfaces of the belt conveyors 55 and 56 pull the bread dough 3 downward.

The second movable member of the pressing structure comprises first and second belt conveyors 55' and 56'. The first belt conveyor 55' includes rollers 21' and 22', and an endless belt entrained over the rollers 21' and 22'. The shafts of the rollers 21' and 22' are received in bearings (not shown) mounted on a swingable rod 11'. The rollers 21' and 22' are adapted to rotate by respective drive means (not shown) at the same peripheral speed, so that the conveying surface of the endless belt entrained over the rollers 21' and 22' pulls the bread dough 3 downward. The second belt conveyor 56' is located below the first belt conveyor 55' in a serial arrangement. The shafts of the rollers 23' and 24' are received in bearings (not shown) mounted on the swingable rod 11'. The rollers 23' and 24' are also adapted to rotate by respective drive means (not shown) in directions indicated by arrows in FIG. 2, at a peripheral speed higher than that of the rollers 21' and 22'. Therefore, the conveying surface of a belt entrained over the rollers 23' and 24' pulls the bread dough 3 downward at a conveying speed higher than that of the first belt conveyor 55'.

The conveying speed of the belt conveyor 55 can be controlled to be the same as that of the belt conveyor 55'. Similarly, the conveying speed of the belt conveyor 56 can be controlled to be the same as that of the belt conveyor 56'.

Figure 2:
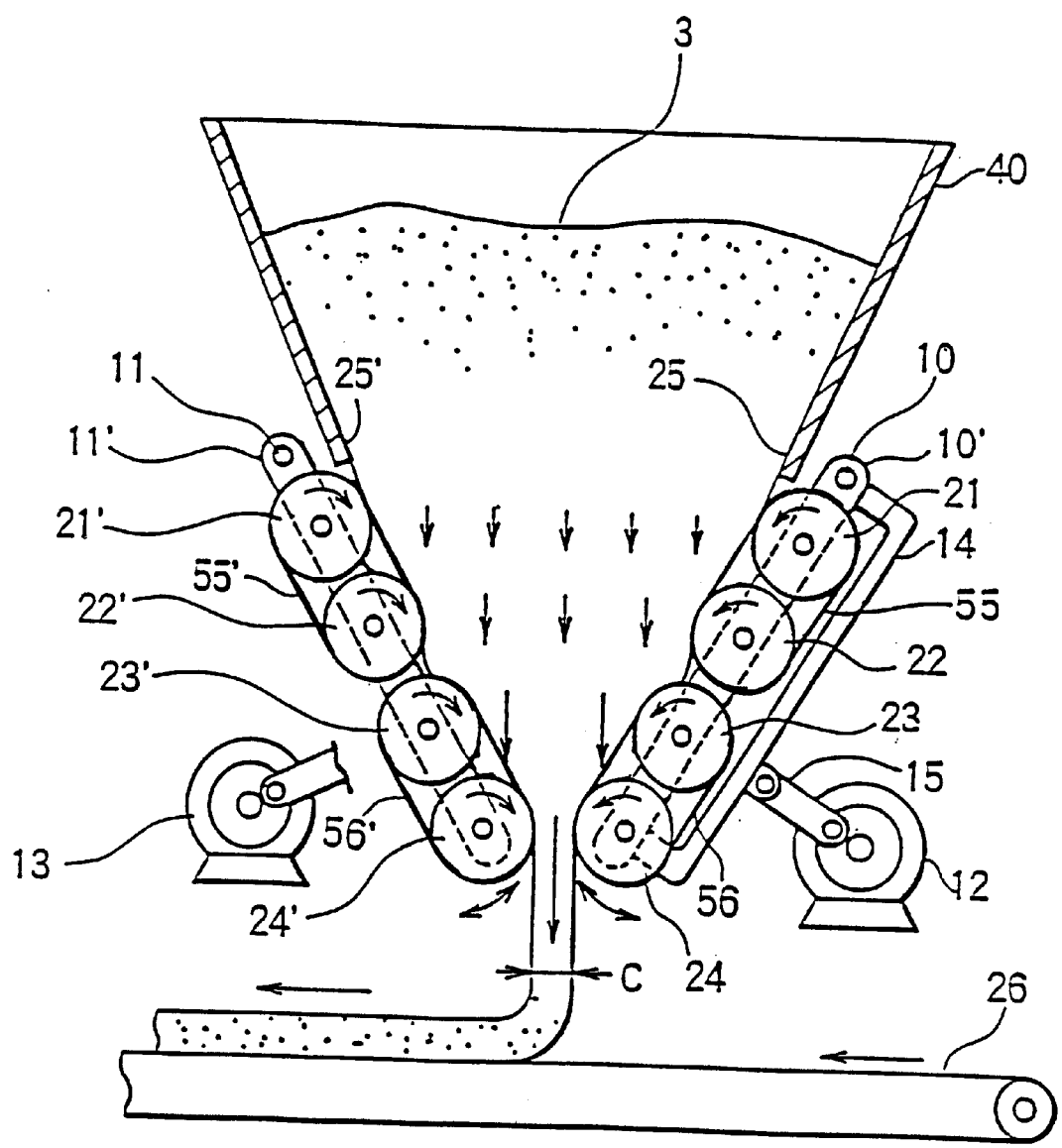
FIG. 2 is a sectional view illustrating an apparatus according to a first embodiment of the present invention.

An arm mounted on the swingable rod 11' and a part of a crank arm swingably mounted on the arm are not shown in FIG. 2. However, the structure used to swingably support the belt conveyors 55' and 56' is the same as for the belt conveyors 55 and 56, so that when a motor 13 is driven, the swingable rod 11' are swung about a supporting point 11. Therefore, the conveying surfaces of the belt conveyors 55' and 56' are reciprocally moved in a generally horizontal direction while the conveying surfaces of the belt conveyors 55' and 56' pull the bread dough 3 downward.

As shown in FIG. 2, the pressing structure of this invention is arranged in a V-shape. The lowermost part of the pressing structure forms a gap c. Below the pressing structure is a belt conveyor 26 for receiving and conveying bread dough 3 flowing downward from the gap c. The distance between the conveying surface of the belt conveyor 55 and the conveying surface of the belt conveyor 55' is greater than the distance between the conveying surface of the belt conveyor 56 and the conveying surface of the belt conveyor 56'. Namely, the distance between the opposed conveying surfaces of an upper pair of belt conveyors (55 and 55') is greater than that between the opposed conveying surfaces of a lower pair of belt conveyors (56 and 56').

Similarly, when three or more pairs of belt conveyors are tiered in a serial arrangement, the distance between opposed conveying surfaces of a lower pair is less than that between opposed conveying surfaces of an upper pair.

The range and speed of swing of the first and second movable members can be controlled by synchronously controlling the speeds of the motors 12 and 13.

When the pressing structure is actuated by driving the motors 12 and 13, the swingable rods 10' and 11' swing about the supporting points 10 and 11, respectively. Therefore, the conveying surfaces of the belt conveyors 55 and 56 move downward, and simultaneously move reciprocally in a generally horizontal direction, thereby alternately approaching and moving away from the conveying surfaces of the belt conveyors 55' and 56', respectively. Further, the swinging movements of the swingable rods 10' and 11' are synchronized so that the conveying surfaces of the belt conveyors 55 and 56 and the opposed conveying surfaces of the belt conveyors 55' and 56' are moved so as to simultaneously approach each other and to simultaneously move away from each other, thereby repeatedly pressing, and then releasing the pressure from, the bread dough 3 positioned therebetween.

Thus, the bread dough 3 located in the pressing structure sustains the repeated pressing and releasing actions (vibrations) applied by the first and second moving members. Therefore, the pressure upon the bread dough 3 is applied such that the bread dough is softened in the pressing structure, thereby causing the bread dough to flow downward from the gap c.

The discharge speed of bread dough from the pressing structure generally equals the peripheral speeds of the lowermost belt conveyors (56 and 56').

One or both of the two movable members of the pressing structure of this invention are reciprocally moved in a generally horizontal direction using the swingable rods 10' or 11', which swing about the supporting points 10 or 11, respectively. Alternatively, the belt conveyors may be reciprocally moved using any relevant device so that these belt conveyors are linearly moved in a horizontal direction.

One or both of the two movable members of the pressing structure of the present invention can be reciprocally moved to increase and decrease the distance between the two movable members. For instance, only the belt conveyors 55 or 56 may be reciprocally moved, while the belt conveyors 55' and 56' are held stationary, with their respective conveying surfaces moving the dough downward.

Alternatively, swingable rods, arms, crank arms, and motors, can be provided for the respective belt conveyors 55, 56, 55', and 56', respectively, so that these belt conveyors can be actuated for their respective conveying and reciprocating movements.

Therefore, the reciprocal movements of the pair of upper belt conveyors 55 and 55' can be carried out alternately with the reciprocal movements of the pair of lower belt conveyors 56 and 56'. Namely, for example, for one or two seconds the reciprocal movements of the belt conveyors 55 and 55' are stopped, and the reciprocal movements of the belt conveyors 56 and 56' are carried out. Then for one or two seconds the reciprocal movements of the belt conveyors 55 and 55' are carried out, and the reciprocal movements of the belt conveyors 56 and 56' are stopped. These movements are repeatedly carried out, so that the bread dough 3 can be pressed and not pressed. Further, when three or more pairs of belt conveyors are tiered, the movements of a pair of upper belt conveyors can be transmitted to the reciprocal movements of a pair of lower belt conveyors.

In any event, the bread dough 3 from the hopper 40 easily enters the gap between the two movable members. Therefore, a problem associated with prior art apparatuses wherein bread dough positioned between opposed rollers or bread dough remaining in the hopper does not fall due to a bridge phenomenon is resolved, so that bread dough is readily fed downward. Further, the conveying surface of a belt conveyor is relatively wide and its frictional force against bread dough is usually higher than that of the surface of a roller. Therefore, the bread dough 3 is more effectively pulled downward by the conveying surfaces of the belt conveyors 55, 56, 55', and 56', as compared with the structure disclosed in FIG. 1.

As explained above, in this embodiment the two movable members are arranged to form a V-shape. However, the shape formed by the two movable members is not limited to a V-shape. Also, the rate of reduction of the distance between opposed belt conveyors (the angle of the V-shape) and the conveying speeds of respective belt conveyors can be optionally selected.

In this embodiment the supporting points of the first and second movable members are positioned at the upper ends of the swingable rods. However, if a quantitative supply of bread dough is effected, the position of a supporting points can be optionally selected. Therefore, the position of supporting points is not limited to the positions shown in FIG. 2.

In the first embodiment, the two belt conveyors 55 and 56 are used for one of the two movable members. However, alternatively, a single belt conveyor may be used. In this case a single belt conveyor may be disposed for the other movable member. Namely, a pair of belt conveyors are disposed below the hopper 40. Swingable rods, arms, crank arms, and motors are provided for the respective belt conveyors. When the motors are driven, the two conveying surfaces of the belt conveyors alternately press and release the bread dough 3, and pull the softened bread dough 3 downward.

Figure 3:
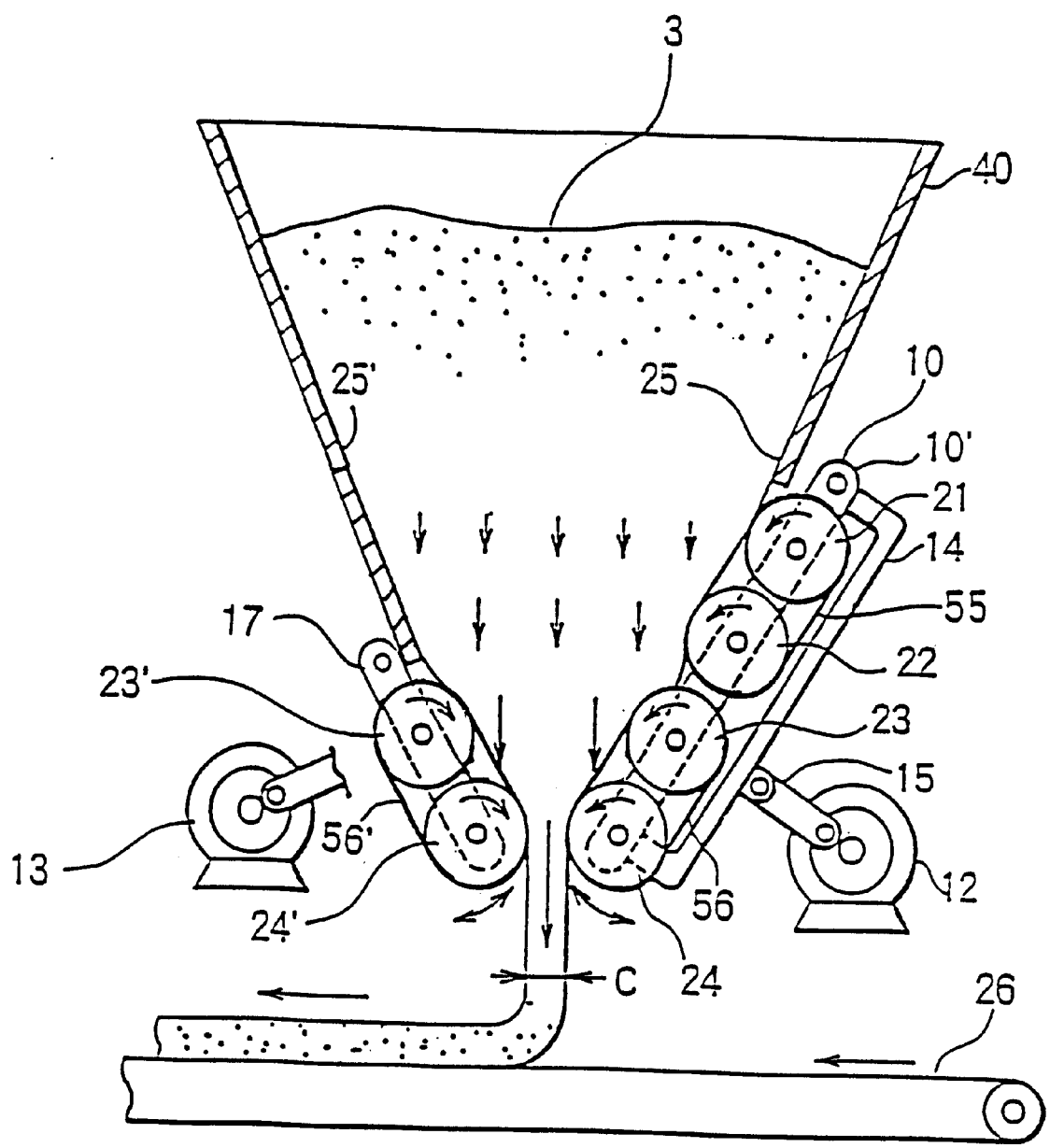
FIG. 3 is a sectional view illustrating an apparatus according to a second embodiment of the present invention.

A second embodiment of the present invention will now be described with reference to FIG. 3.

This embodiment is almost the same as that of the first embodiment except that one of the movable members is composed of one belt conveyor, namely, the belt conveyor 56'. An arm swingably mounted on a swingable rod 17 and a part of a crank arm mounted on the arm are not shown in FIG. 3. The conveying and reciprocating movements of the belt conveyor 56' are similar to those of the first embodiment.

A third embodiment of this invention will be explained below by reference to FIG. 4.

Just below the bottom opening of a hopper 40, the pressing structure of the third embodiment is disposed which comprises first and second movable members. The first movable member comprises two belt conveyors 55 and 56. These conveyors and their related functions are the same as those of the pressing structure of the first embodiment. The second movable member of the pressing structure includes a roller group 20' comprising rollers 21', 22', 23', and 24'. The shafts of these rollers are received in respective bearings (not shown) mounted on a swingable rod 11', and these rollers can be rotated about their axes by respective drive means (not shown).

The peripheral speeds of the rollers 21' and 22' are adapted to be the same as the conveying speeds of the belt conveyor 55, and the peripheral speeds of the rollers 23' and 24' are adapted to be the same as the conveying speed of the belt conveyor 56. Further, the peripheral speeds of the rollers 23' and 24' are higher than those of the rollers 21' and 22'.

Alternatively, the peripheral speed of a lower roller can be adapted to be higher than that of an upper roller, since these rollers 21', 22', 23', and 24' are adapted to be separately driven by respective drive means. Each of these drive means is controlled by a control unit (not shown) so that the peripheral speed of a lower roller is higher than that of an upper roller. Namely, the peripheral speed of the roller 24' is higher than that of the roller 22'. Similarly, the peripheral speed of the roller 23' is higher than that of the roller 22'. In this case, the conveying speed of the belt conveyor 56 needs to be about the same as the peripheral speed of the roller 24', and to be faster than the conveying speed of the belt conveyor 55. Further, the conveying speed of the belt conveyor 55 needs to be about the same as the peripheral speed of the roller 22'.

Alternatively, a belt conveyor (not shown) can be disposed between the rollers 21' and 24' in place of the rollers 22' and 23'.

Figure 4:
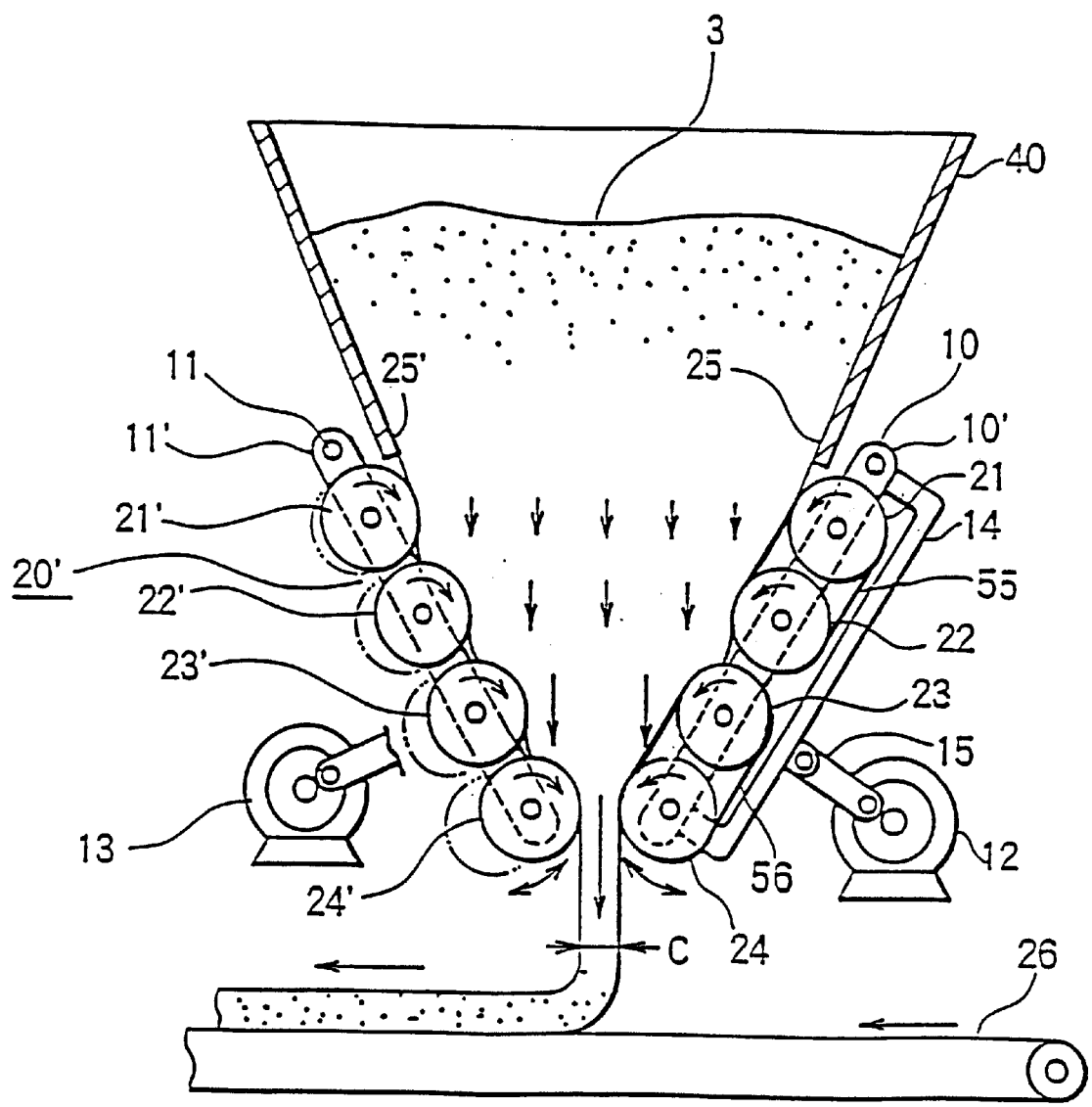
FIG. 4 is a sectional view illustrating an apparatus according to a third embodiment of the present invention.

An arm to be mounted on the swingable rod 11' and a part of a crank arm to be swingably mounted on the arm are not shown in FIG. 4. However, when the motor 13 is driven, the swingable rod 11' can swing about a supporting point 11. Therefore, these rollers are reciprocally moved in a generally horizontal direction while they pull the bread dough 3 downward.

As shown in FIG. 4, the lowermost part of the pressing structure provides a gap c. Below the pressing structure a belt conveyor 26 is disposed to receive and convey bread dough 3 flowing downward from the gap c.

When the pressing structure is actuated by driving the motors 12 and 13, the swingable rods 10' and 11' swing about the supporting points 10 and 11, respectively. Therefore, the conveying surfaces of the belt conveyors 55 and 56 move downward, and simultaneously they reciprocally move in a generally horizontal direction to approach, and retract from, the rollers 21', 22', 23', and 24'. Further, the swinging movements of the swingable rods 10' and 11' are controlled to be synchronized so that the conveying surfaces of the belt conveyors 55 and 56 and the opposed rollers 21', 22', 23', and 24' are moved so as to simultaneously approach each other and to simultaneously retract from each other, thereby repeatedly pressing and lessening the pressure on the bread dough 3 positioned therebetween.

Thus, the bread dough 3 located in the pressing structure sustains the repeated pressing and releasing action of the pressing structure. Therefore, the pressure on the bread dough 3 is prevented from increasing, so that it is softened to thereby flow downward from the gap c.

The discharge speed of the bread dough from the pressing structure generally equals the peripheral speeds of the lowermost belt conveyor and the lowest roller.

The reciprocal movements of the rollers 21' and 22' can be adapted to be carried out alternately with the reciprocal movements of the rollers 23' and 24' and in synchronization with the alternate movements of the belt conveyors 55 and 56. Further, the reciprocal movement of an upper roller can be relayed to the reciprocal movements of a lower roller in synchronization with the relay of the reciprocal movements of the belt conveyor 55 to the belt conveyor 56.

In any event, the bread dough 3 from the hopper 40 easily enters the space between the two movable members.

Therefore, a problem in the prior method wherein bread dough positioned between opposed rollers or bread dough remaining in the hopper does not fall due to a bridge phenomenon is resolved, so that bread dough is readily fed downward.

In this embodiment one of the two movable members comprises four rollers. The frictional force of the surfaces of the rollers is relatively less as compared with the surfaces of the conveyor belts. Therefore, in this embodiment the force to pull bread dough downward is somewhat less than the force in the first embodiment.

However, the bread dough 3 is more effectively pulled downward by the conveying surfaces of the belt conveyors 55 and 56 and the surfaces of the rollers 21', 22', 23', and 24', as compared with the invention of the prior application.

The present invention provides the pressing structure comprising two movable members located below a bread dough feeder so as to repeatedly increase and decrease the distance between the two movable members when the bread dough from the bread dough feeder is pressed. Therefore, the pressure on the bread dough located between the two movable members is prevented from rising.

Thus, the bread dough can be steadily discharged in a stable condition from the gap between the two movable members. Because at least one of the two movable members of the pressing structure of this invention comprises a belt conveyor or a plurality of lengthwise tiered belt conveyors, its conveying surface or their conveying surfaces effectively pull the bread dough downward, as compared with the method and apparatus of the invention shown in FIG. 1.

I claim:

1. A method of continuously and quantitatively supplying bread dough, comprising:

providing a pressing structure which includes first and second movable members, the first movable member having at lest one roller or one belt conveyor and the second movable member having at least one belt conveyor, such that the first and second movable members are oppositely positioned in a horizontal direction below a bread dough feeder, putting bread dough into the bread dough feeder, supplying the bread dough from the bread dough feeder between the first and second moveable members, reciprocally moving at least one of the first and second members in a generally horizontal direction to increase and decrease the distance between the first and second movable members, while the at least one roller or one belt conveyor of the first moveable member and the at least one belt conveyor of the second movable member are driven to convey the bread dough downward therebetween, thereby preventing pressure applied to the bread dough positioned between the first and second movable members from being excessively increased, so as to allow the bread dough to stably flow downward therebetween.

* * * * *